United States Patent
Alloin et al.

(10) Patent No.: US 11,231,006 B2
(45) Date of Patent: Jan. 25, 2022

(54) METHOD FOR STABILIZING THE ROTATION SPEED OF A HYDRAULIC MACHINE WITH S-CHARACTERISTICS AND INSTALLATION FOR CONVERTING HYDRAULIC ENERGY INTO ELECTRICAL ENERGY

(71) Applicant: GE Renewable Technologies, Grenoble (FR)

(72) Inventors: Quentin Alloin, Grenoble (FR); Nicolas Perrissin-Fabert, Grenoble (FR); Renaud Guillaume, Grenoble (FR)

(*) Notice: Subject to any disclaimer, the term of this patent is extended or adjusted under 35 U.S.C. 154(b) by 173 days.

(21) Appl. No.: 15/500,057

(22) PCT Filed: Jul. 24, 2015

(86) PCT No.: PCT/EP2015/067069
§ 371 (c)(1),
(2) Date: Jan. 28, 2017

(87) PCT Pub. No.: WO2016/016149
PCT Pub. Date: Feb. 4, 2016

(65) Prior Publication Data
US 2017/0268477 A1 Sep. 21, 2017

(30) Foreign Application Priority Data

Jul. 29, 2014 (EP) ..................... 14178909

(51) Int. Cl.
*F03B 3/18* (2006.01)
*F03B 15/00* (2006.01)
*F03B 15/14* (2006.01)

(52) U.S. Cl.
CPC ............ *F03B 3/183* (2013.01); *F03B 3/18* (2013.01); *F03B 15/005* (2013.01); *F03B 15/14* (2013.01);
(Continued)

(58) Field of Classification Search
CPC .......... F03B 3/18; F03B 3/183; F03B 15/005; F03B 15/14; F03B 15/02; F03B 15/06;
(Continued)

(56) References Cited

U.S. PATENT DOCUMENTS

| 4,419,047 A | 12/1983 | Klemm et al. |
| 4,625,125 A * | 11/1986 | Kuwabara ............... F03B 15/06 |
| | | 290/52 |

(Continued)

FOREIGN PATENT DOCUMENTS

| CN | 1295189 A | 5/2001 |
| CN | 1312432 A | 9/2001 |

(Continued)

OTHER PUBLICATIONS

Extended European Search Report and Opinion issued in connection with corresponding EP Application No. 14178909.9 dated Jan. 30, 2015.

(Continued)

Primary Examiner — Philip E Stimpert
(74) Attorney, Agent, or Firm — Dority & Manning, P.A.

(57) ABSTRACT

A method for stabilizing the rotation speed of a machine with S-characteristics is provided. The method includes calculating a target net head and a target opening to affect guide vanes of the machine, the target net head and the target opening being calculated so that the torque exerted by water flow on the turbine is null and that the machine rotates at a target rotation speed; determining a real net head to which the machine is subjected; comparing the target net head with the real net head; and adjusting the opening of the guide vanes so as to converge towards the target opening and reduce a height difference between the target net head and the real net head.

8 Claims, 3 Drawing Sheets

(52) U.S. Cl.
CPC ..... *F05B 2220/32* (2013.01); *F05B 2220/706* (2013.01); *F05B 2270/1014* (2013.01); *Y02E 10/20* (2013.01)

(58) Field of Classification Search
CPC ........ F03B 15/08; F03B 3/02; F05B 2220/32; F05B 2220/706; F05B 2270/1014; Y02E 10/223; Y02E 10/225
See application file for complete search history.

(56) References Cited

U.S. PATENT DOCUMENTS

| | | | | |
|---|---|---|---|---|
| 4,640,664 | A | * 2/1987 | Sato | ........................ F03B 15/14 415/1 |
| 4,920,277 | A | * 4/1990 | Kuwabara | ............... F03B 15/06 290/40 C |

FOREIGN PATENT DOCUMENTS

| | | |
|---|---|---|
| CN | 1379175 A | 11/2002 |
| CN | 1119525 C | 8/2003 |
| CN | 103452746 A | 12/2013 |
| DE | 198 60 617 C1 | 10/2000 |
| GB | 2 057 585 A | 4/1981 |
| JP | H01-208572 A | 8/1989 |
| SU | 1671948 A1 | 8/1991 |

OTHER PUBLICATIONS

International Search Report and Written Opinion issued in connection with corresponding PCT Application No. PCT/EP2015/067069 dated Dec. 10, 2015.

International Preliminary Report on Patentability issued in connection with corresponding PCT Application No. PCT/EP2015/067069 dated Jan. 31, 2017.

Machine translation and First Office Action and Search issued in connection with corresponding CN Application No. 201580041673.4 dated Jun. 29, 2018.

Office Action and Search issued in connection with corresponding RU Application No. 2017102700 dated Dec. 24, 2018.

\* cited by examiner

METHOD FOR STABILIZING THE ROTATION SPEED OF A HYDRAULIC MACHINE WITH S-CHARACTERISTICS AND INSTALLATION FOR CONVERTING HYDRAULIC ENERGY INTO ELECTRICAL ENERGY

Embodiments of the invention relates to a method for stabilizing the rotation speed of a hydraulic machine with S-characteristics. Typical hydraulic machines with S-characteristics are pump-turbine functioning in turbine mode or Francis turbine designed for high net head conditions. The invention also concerns an installation for converting hydraulic energy into electrical energy, on which this method can be implemented.

During a pump-turbine start-up in turbine mode, the rotation speed of its runner must be stabilized, so that the machine can be coupled to the grid. Ideally, the rotation speed of the machine is synchronized with the grid frequency. Besides, the pump-turbine is piloted so as to work at no load operating point at which the momentum applied by the water flow on the runner is null.

In low water fall conditions, rotational speed stabilization may be hard to reach because of the presence of "S-zones". "S-zones" are zones visible on a graph representing the momentum in function of the rotation speed of the machine. On this kind of graph, it can be seen that the curve of the momentum plotted against the rotation speed may be S-shaped, thereby inducing that the no load operating point is unstable. This means that a slight variation of the rotation speed of the machine relative to the optimal operating point implies a significant increase of the momentum applied by the water flow on the runner of the pump-turbine, hence substantially increasing or decreasing the rotation speed of the machine. Under these conditions, it is not possible to stabilize the rotational speed of the hydraulic machine with a conventional PID loop.

BRIEF DESCRIPTION

To solve this problem, it is known to completely redesign hydraulic parts of the machine, such as the runner or the guide vanes. In particular, hydraulic parts of the machine are redesigned to avoid the presence of S-zones in the operating range of the pump-turbine in turbine mode. The operating range of a machine corresponds to the interval between the lower gross head and the upper gross head of an installation which will incorporate the machine. However, this solution is very expensive to implement and reduces the performance of the pump-turbine.

Another solution consists in equipping the pump-turbine with non-synchronized guide vanes. This means that some guide vanes can be oriented independently. As a result, at machine start-up, some of the guide vanes are opened further than others, which temporarily modifies the machine characteristics. This allows avoiding the presence of S-zones in the operating range of the machine. Nevertheless, this solution generates unwilled vibrations which impact the lifetime of the machine.

The invention intends to solve this drawback by proposing a method for stabilizing the rotation speed of a hydraulic machine that is cheaper than known methods and that does not impact the performance of the machine.

To this end, the invention concerns a method for stabilizing the rotation speed of a hydraulic machine with S-shaped characteristic curves so that the machine can be coupled to the grid, this hydraulic machine including a runner and a distributor that is arranged around the runner and that includes a plurality of movable guide vanes. It includes steps consisting in:

calculating a target net head and a target opening to affect guide vanes of the machine, the target net head and the target opening being calculated so that the torque exerted by water flow on the runner of the machine is null and that the machine rotates at a target rotation speed based on the grid frequency, determining a real net head to which the machine is subjected, comparing the target net head with the real net head, and adjusting the opening of the guide vanes so as to converge towards the target opening and reduce a height difference between the target net head and the real net head.

Thanks to the invention, the rotation speed of the hydraulic machine is stabilized by acting on the net head of the installation. Indeed, the stabilization of the net head leads to the stabilization of the rotation speed of the machine. More precisely, the net head of the installation is controlled so as to converge towards a target net head and the opening of the guide vanes is piloted so as to converge towards a target opening. The target opening and the target net head are calculated as values at which the rotational speed of the machine is theoretically synchronized with a desired rotation speed, based on the grid frequency and at which no momentum is exerted by water on the machine. As a result, the stabilization of the net head at this target net head results in a machine rotational speed that is close to the desired rotational speed. Consequently, the machine may be synchronized to the grid using a synchronizer.

Further aspects of the invention which are advantageous but not compulsory are specified below:

The method further includes steps consisting in:

measuring the real rotation speed of the machine, comparing the real rotation speed with the target rotation speed, while, at step d), the opening of the guide vanes is adjusted to reduce also a speed difference between the target rotation speed and the real rotation speed.

At step d), the opening of the guide vanes is adjusted by calculating a setpoint opening to affect the guide vanes.

The setpoint opening is calculated by summing up the target opening with a first opening variation depending on the height difference between target net head and real net head and with a second opening variation depending on the speed difference between target rotation speed and the real rotation speed.

The first opening variation is outputted by a first corrector module, having as input the height difference between target net head and real net head.

The first corrector module is a proportional derivative corrector.

The second opening variation is outputted by a second corrector module, having as input the speed difference between target rotation speed and the real rotation speed.

The second corrector module is a proportional integrative derivative corrector.

The invention also concerns an installation for converting hydraulic energy into electrical energy, comprising a machine having a runner and a distributor that is arranged around the runner and that includes a plurality of adjustable guide vanes and means to determine a real net head of the installation. it also includes:

means to calculate a target net head and a target opening to affect guide vanes of the machine, the target net head and the target opening being calculated so that the torque exerted by water flow on the runner of the machine is null and that the machine rotates at a target rotation speed based on the grid frequency, means to compare a target net head with a real net head to which the machine is subjected, and means to adjust the opening of the guide vanes so as to converge towards the target opening and reduce a height difference between the target net head and the real net head.

According to an advantageous but not compulsory aspect, the installation further includes:

means to calculate a target rotation speed of the machine, means to measure real rotation speed of the machine, means to compare the real rotation speed with the target rotation speed, while the means to adjust the opening of the guide blades are configured to reduce also a speed difference between target rotation speed and real rotation speed.

BRIEF DESCRIPTION OF THE DRAWINGS

The invention will now be explained in correspondence with the figures, and as an illustrative example, without restricting the object of the invention. In the figures:

FIG. 1 represents an installation 2 for converting hydraulic energy into electrical energy. The installation 2 includes a hydraulic machine. In the example, this hydraulic machine is a pump-turbine 20 that uses, in turbine mode, hydraulic energy to set a shaft 201 in rotation. The shaft 201 is coupled to an alternator to produce electricity.

DETAILED DESCRIPTION

Figure 1:
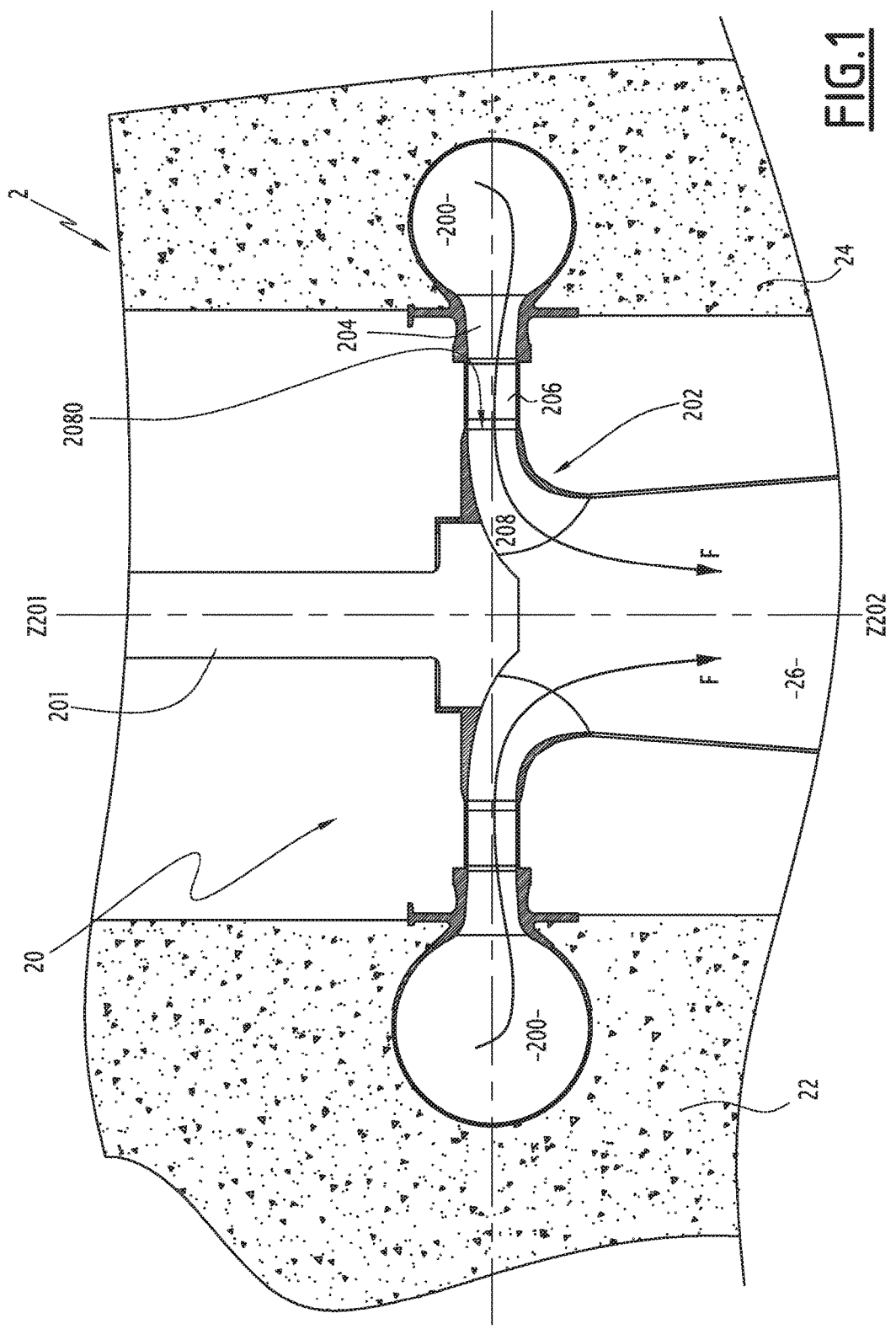
FIG. 1 is a schematic section of an installation for converting hydraulic energy into electrical energy according to the invention.

Here-below, the functioning of the pump-turbine 20 is described in turbine mode. The pump-turbine 20 includes a volute 200 that is supported by concrete blocks 22 and 24. A non-represented penstock extends between a non-represented upstream reservoir and the volute 200. This penstock generates a forced water flow F to power the machine 20. The machine 20 includes a runner 202 that is surrounded by the volute 200 and that includes blades 208 between which water flows in operating conditions. As a result, the runner 202 rotates around an axis Z202 that is superimposed with the axis of rotation Z201 of the shaft 201.

A distributor is arranged around the runner 202. It includes a plurality of movable guide vanes 206 that are evenly distributed around the runner 202. A pre-distributor is disposed upstream of and around the distributor. The pre-distributor is formed by a plurality of fixed vanes 204 evenly distributed around the axis of rotation Z202 of the runner 202.

A suction pipe 26 is disposed below the runner 202 and is adapted to evacuate water downstream.

The guide vanes 206 of the distributor have each an adjustable pitch around an axis parallel to the axis of rotation Z202 of the runner 202. Consequently, they may be swiveled to regulate the water flow rate. The guide vanes 206 are all oriented with the same angle relative to a closed position. In other words, they are synchronized.

C11 and N11 are characteristics parameters of the pump-turbine 20. They are given by the flowing equations:

$$C11 = \frac{C}{D^3 * H}$$

and $$N11 = \frac{N*D}{\sqrt{H}}$$

wherein C is the torque exerted by water flow F on the runner 202, D the diameter of runner 202 and H the net head of installation 2.

Figure 4:
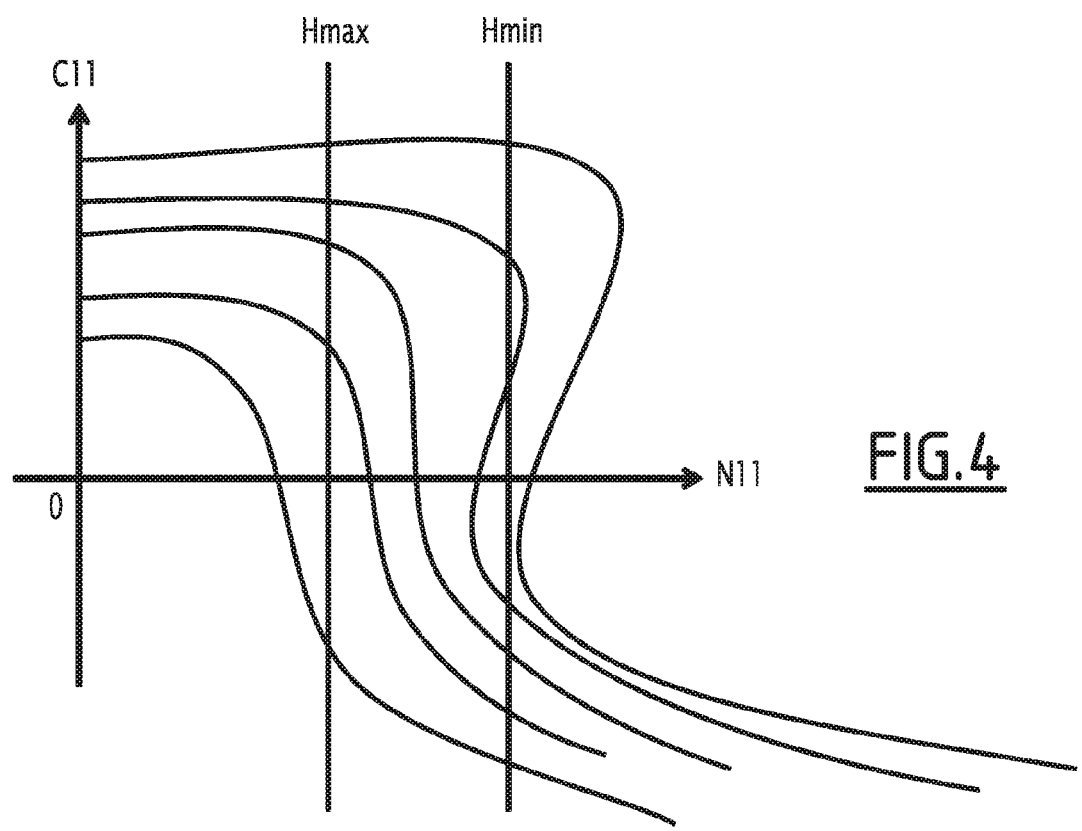
FIG. 4 is a graph representing characteristics in turbine mode of the pump-turbine of the installation of FIG. 1.

FIG. 4 represents curves representing C11 plotted over N11. These curves correspond each to a specific orientation of guide vanes 206.

On FIG. 4, the operating range of the machine 20, that corresponds to the interval between the lower gross head and the upper gross head of the installation 2, is delimited between two vertical lines Hmin and Hmax, respectively for the lower gross head and the higher gross head of the installation 2.

As shown on this figure, the hydraulic machine 20 has S-characteristics. Indeed, under low water fall conditions, the curves of C11 plotted against N11 are S-shaped. In these conditions, the no load operating point, that is the point at which no momentum is exerted on the runner 202 and at which the rotation speed of the machine 20 is at a desired, or target speed Nc is unstable. It is then impossible to stabilize machine rotational speed at the desired speed Nc using classical controllers.

Here-below one explains, in correspondence with FIG. 2, a method for stabilizing the rotation speed of the runner 202 in "S-zones" during machine start-up so as to synchronize machine 20 with the grid.

Figure 2:
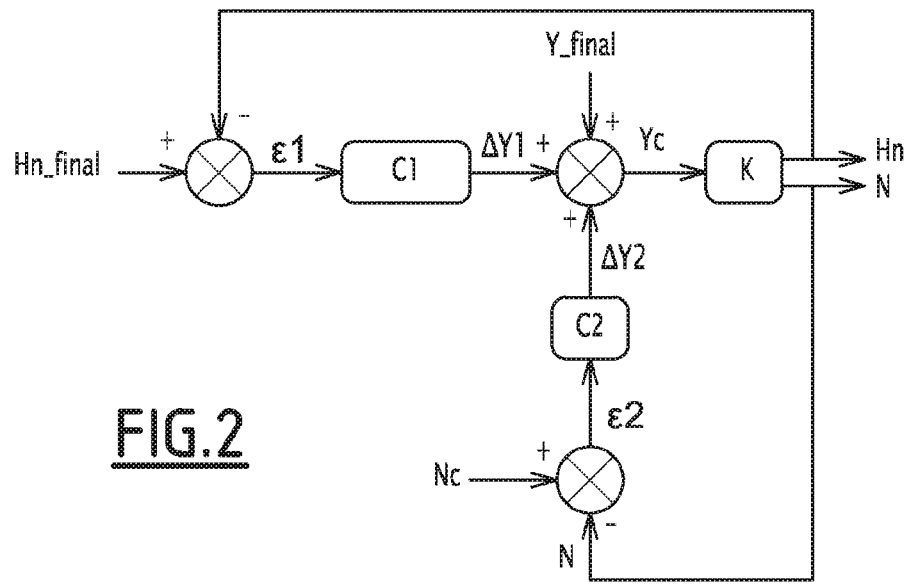
FIG. 2 is a control scheme illustrating a method according to the invention, that aims at stabilizing the rotation speed of a pump-turbine belonging to the installation of FIG. 1.

As shown on FIG. 2, this method can be implemented by means of a closed-loop system.

In the present document, the net head is the difference between water pressure upstream the machine and water pressure downstream the machine.

A first step of the method is to calculate a target net head Hn_final to reach and a target opening Y_final to affect the guide vanes 206. The target net head Hn_final and the target opening Y_final are numerically determined so that, theoretically, the torque exerted by water flow F on the runner 202 is null and that the machine rotates at the desired speed Nc. The values Y_final and Hn_final are calculated in function of the gross head, of the installation design and of friction losses.

A second step of the method consists in determining the real net head Hn of the installation, which is the net head at any moment. For example, this real net head Hn can be measured using pressure sensors disposed upstream and downstream machine 20. The target net head Hn_final and the real net head Hn are then compared using a comparator. A height difference ε1 between the target net head Hn_final and the real net head Hn is used as input to determine a setpoint opening Yc to affect the guide vanes 206. More precisely, the height difference £ 1 forms the input of a first corrector module C1. In the example, C1 is a proportional derivative corrector but it may also be a proportional corrector or any other kind of corrector. This first corrector C1 outputs a first opening variation value ΔY1 to affect the guide vanes 206 so as to reduce ε1. The corrector C1 increases the stability and the speed of the system.

Machine rotational speed N can be stabilized only by steadying the net head Hn at the target net head Hn_final. Hn-final and Y_final are only theoretical values. Therefore, when the net head Hn is steadied at the final net head Hn_final, the machine 20 rotates approximately at the target rotation speed Nc. It may however be synchronized to the grid but it is needed to adjust the rotation speed of the shaft 201 coupled to the alternator so as to deliver voltage at the adequate frequency and phase. For instance, synchronizers may be used to slightly accelerate or decelerate the machine rotational speed and delete a phase offset. In practice, the machine 20 may be synchronized with a tolerance of +/−0.2% regarding the speed. There is no criterion on the torque as it is possible to synchronize with a torque different from zero.

In order to avoid this supplementary step, the method also includes steps to regulate the rotation speed N of the machine. The rotation speed N of the runner 20 is measured and it is compared with the target rotation speed Nc. A speed difference ε2 between the target rotation speed Nc and the measured rotation speed N is used as input to determine the setpoint opening Yc. More precisely, the speed difference ε2 forms the input of a second corrector module C2. In general, C2 is a proportional integrative derivative corrector that ensures a zero steady state error. In the example, C2 is an integrative corrector. This means that the rotation speed N of pump-turbine 20 may be precisely controlled. This second corrector C2 outputs a second opening variation value ΔY2 to affect the guide vanes 206 so as to reduce ε2.

ΔY1, ΔY2 and the setpoint opening Yc are dynamic parameters while target opening Y_final and target net head Hn_final are static parameters.

The setpoint opening Yc is calculated by summing up the target opening Y_final with the first opening variation ΔY1 and with the second opening variation ΔY2. Accordingly, it allows adjusting the opening of the guide vanes 206 so as to converge towards the target opening Y_final and reduce the height difference ε1 between the target net head and the real net head and the speed difference ε2 between the target rotation speed Nc and the real rotation speed N. On FIG. 2, K denotes the transfer function of the pump-turbine 20. K takes, as an input, the setpoint opening Yc of the guide vanes 206 and outputs the rotation speed N and the net head Hn.

This regulation system acts both on the net head Hn, for stabilization purpose, and on the rotation speed N, for synchronization purpose. As explained here-above, it is possible to act only on the net head Hn but it does not ensure the stabilized speed to be in the admissible range of synchronization speed, hereby chosen at +/−0.2% relative to the target speed Nc.

Calculation steps of the method described here-above that are used to determine Hn_final, Y_final and Yc as well as comparison steps to compare the real net head Hn and the target net head Hn_final and the real rotation speed N and the target rotation speed Nc are all performed by a non-represented electronic control unit integrated in the installation 2 and programmed to perform these tasks. This electronic control unit may be integrated in the same controller.

Figure 3:
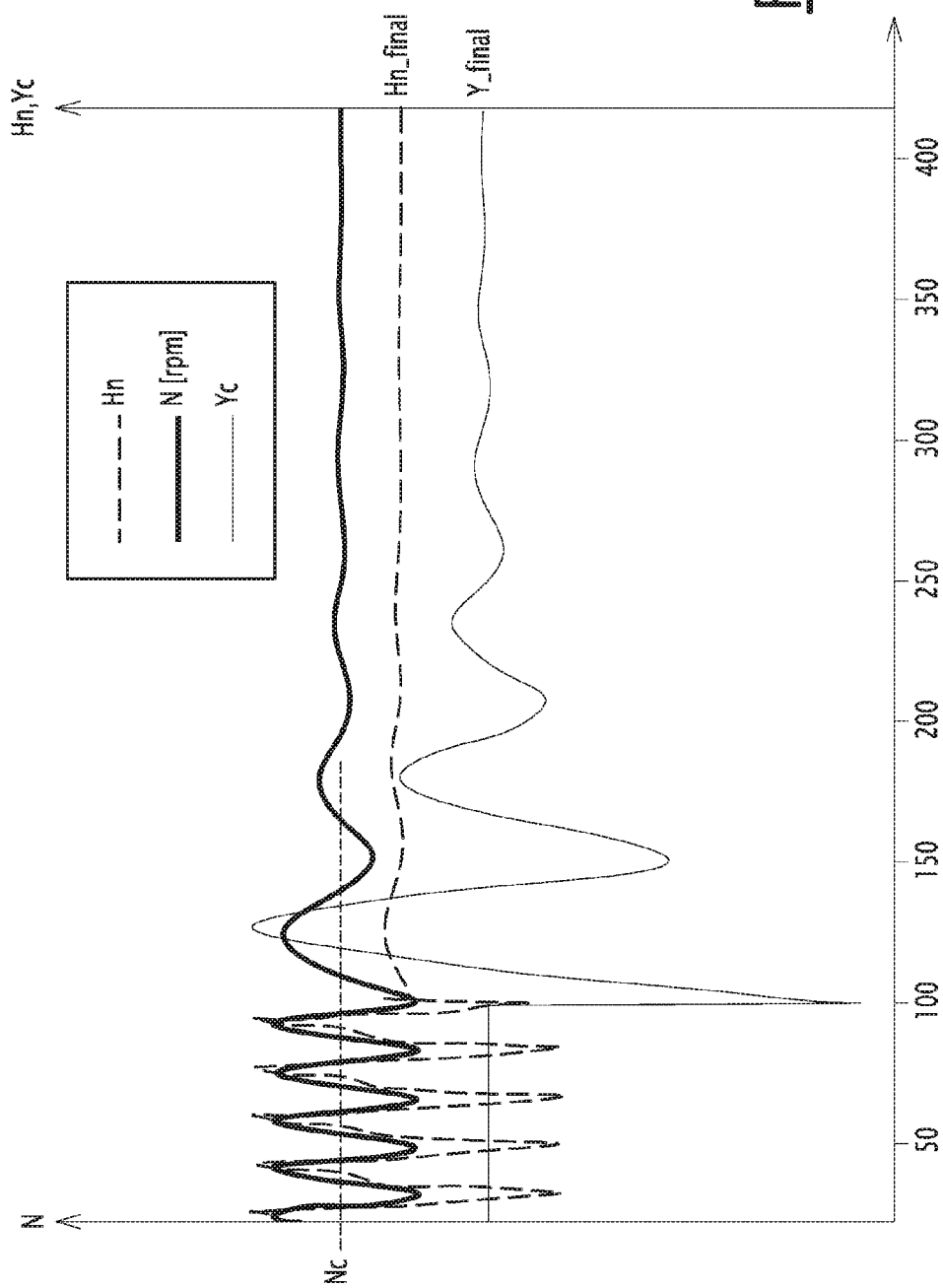
FIG. 3 is a graph representing the curves, plotted over time, of the net head, the rotation speed and the setpoint opening of guide vanes in the installation of FIG. 1.

FIG. 3 shows a graph representing the real net head Hn, the setpoint opening Yc of the guide vanes 206 and the rotation speed N of the runner 202 plotted over time. For the clarity of the graph, the rotation speed N is plotted in thick line, the net head is represented in dashed line and the setpoint opening Yc of the guide vanes is represented in full line.

As shown on this graph, the setpoint opening Yc is constant at start-up and starts varying as from 100 s after start-up, which is the time at which net head regulation starts. Before the stabilization method is implemented, the rotation speed N and the net head Hn oscillate even if the opening of the guide vanes is constant, which is typical for a machine with S-characteristics, such as a pump-turbine in turbine mode or a Francis turbine designed for high water fall conditions.

When the stabilization method is implemented, the rotation speed N of the runner 202 and the net head Hn reach both respectively the target rotation speed Nc and the target net head Hn_final after a period of time of about 350 s has last since start-up.

The technical features of the different embodiments and alternative embodiments of the invention described hereabove can be combined together to generate new embodiments of the invention.

The invention claimed is:

1. A method for stabilizing a rotation speed of a hydraulic machine with S-shaped characteristic curves so that the hydraulic machine is configured for coupling to a grid, the hydraulic machine including a runner and a distributor that is arranged around the runner and that includes a plurality of movable guide vanes, the method comprising:
   calculating a target net head and a target opening to affect the guide vanes of the hydraulic machine, the target net head and the target opening being calculated so that a torque exerted by a water flow on the runner of the hydraulic machine is null and that the hydraulic machine rotates at a target rotation speed based on a grid frequency;
   determining a real net head to which the hydraulic machine is subjected;
   comparing the target net head with the real net head;
   measuring a real rotation speed of the hydraulic machine;
   comparing the real rotation speed with the target rotation speed; and
   adjusting the opening of the guide vanes so as to reduce a speed difference between the target rotation speed and the real rotation speed, converge towards the target opening, and reduce a height difference between the target net head and the real net head.

2. The method according to claim 1, wherein the opening of the guide vanes is adjusted by calculating a set point opening to affect the guide vanes.

3. The method according to claim 2, wherein the set point opening is calculated by summing up the target opening with a first opening variation depending on the height difference between target net head and real net head and with a second opening variation depending on the speed difference between target rotation speed and real rotation speed.

4. The method according to claim 3, wherein the first opening variation is outputted by a first corrector module, having as an input the height difference between target net head and real net head.

5. The method according to claim 4, wherein the first corrector module is a proportional derivative corrector.

6. The method according to claim 3, wherein the second opening variation is outputted by a second corrector module, having as input the speed difference between the target rotation speed and the real rotation speed.

7. The method according to claim 6, wherein the second corrector module is a proportional integrative corrector.

8. An installation for converting hydraulic energy into electrical energy, comprising:
- a machine having a runner; and
- a distributor arranged around the runner and including a plurality of adjustable guide vanes, wherein the distributor is configured to determine a real net head of the installation;
- wherein the installation is configured to:
  - calculate a target net head and a target opening to affect the guide vanes of the machine, the target net head in the target opening being calculated so that a torque exerted by a water flow on the runner of the machine is null and that the machine rotates at a target rotation speed based on a grid frequency,
  - compare a target net head with a real net head to which the machine is subjected,
  - calculate the target rotation speed of the machine,
  - measure a real rotation speed of the machine,
  - compare the real rotation speed with the target rotation speed, and
  - adjust the opening of the guide vanes so as to reduce a speed difference between target rotation speed and real rotation speed converge towards the target opening, and reduce a height difference between the target net head in the real net head.

* * * * *